Feb. 16, 1932. J. MARTIN 1,845,431
COTTON PICKER
Original Filed June 22, 1929 4 Sheets-Sheet 1
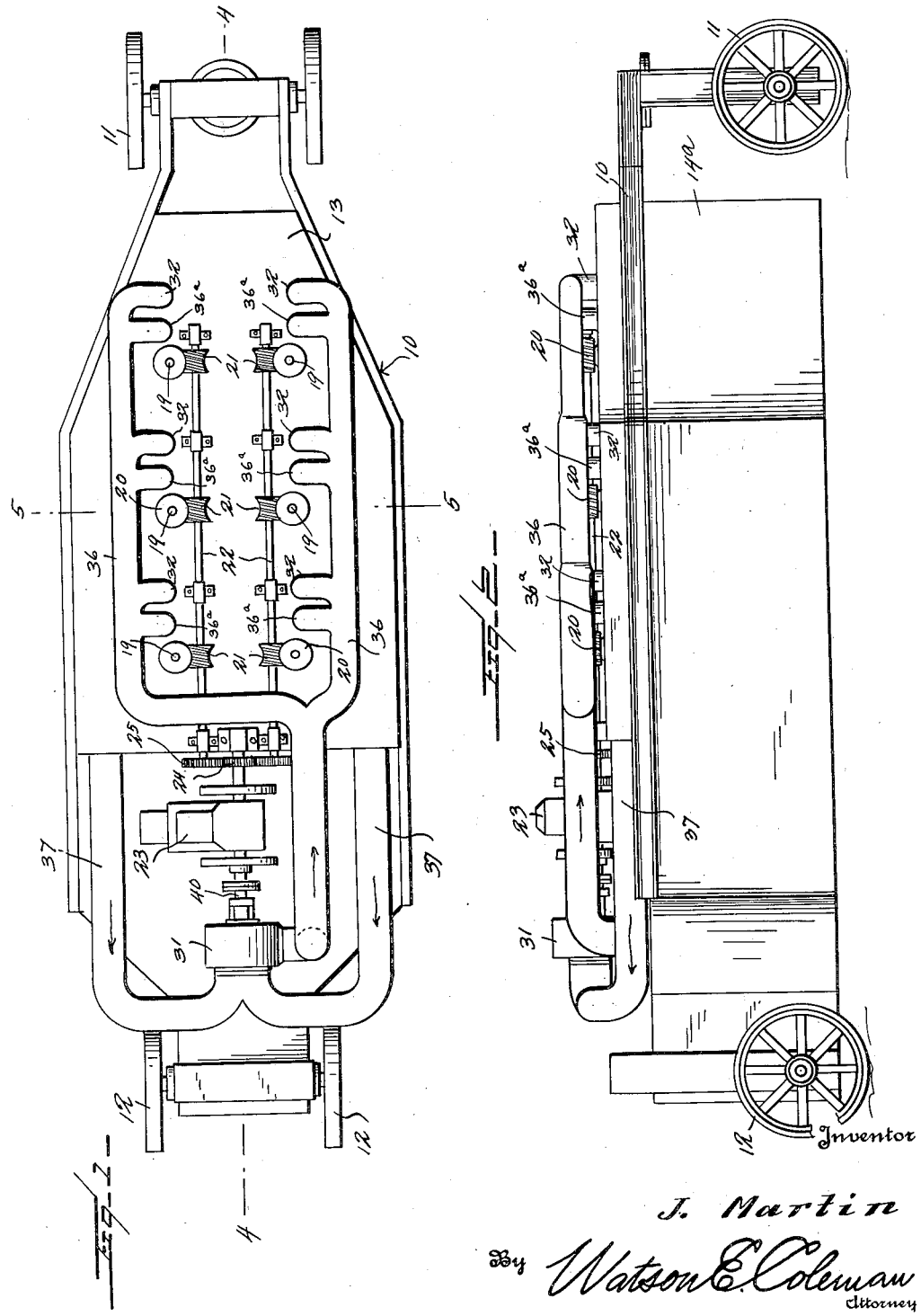
Inventor
J. Martin
By Watson E. Coleman
Attorney

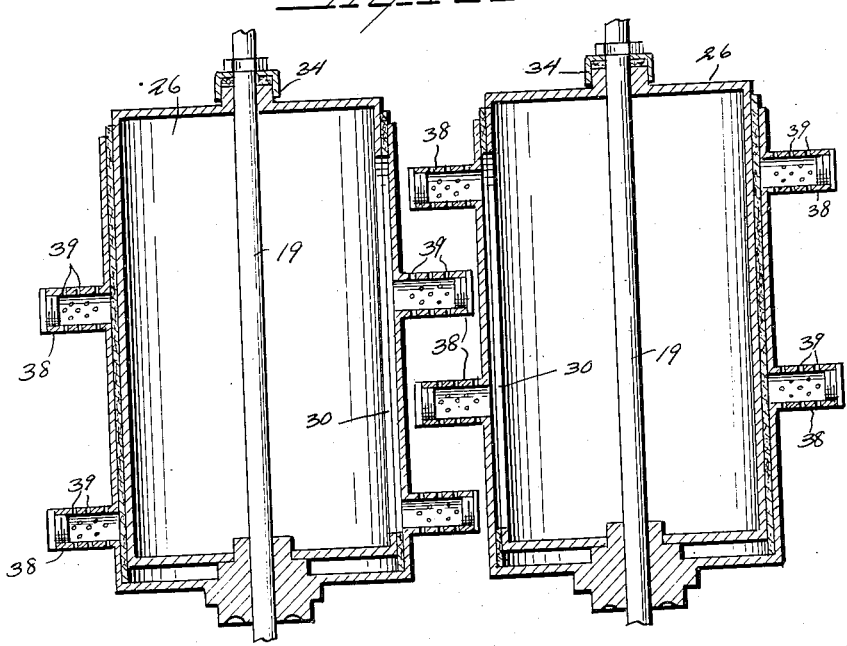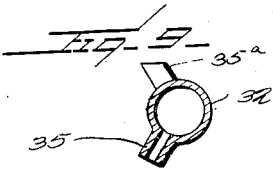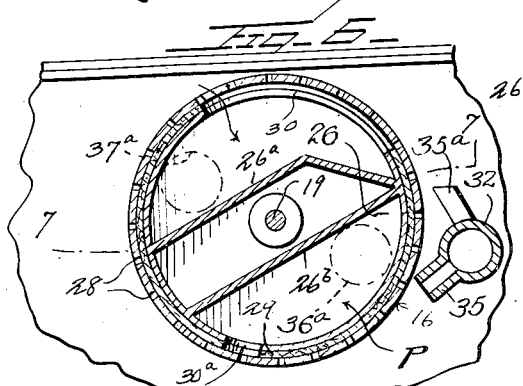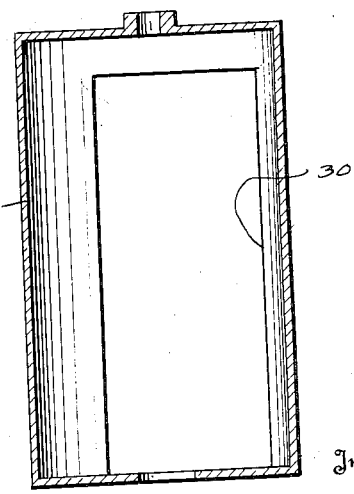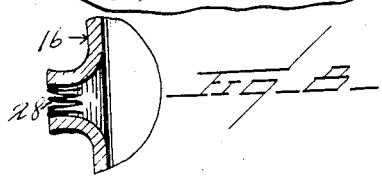

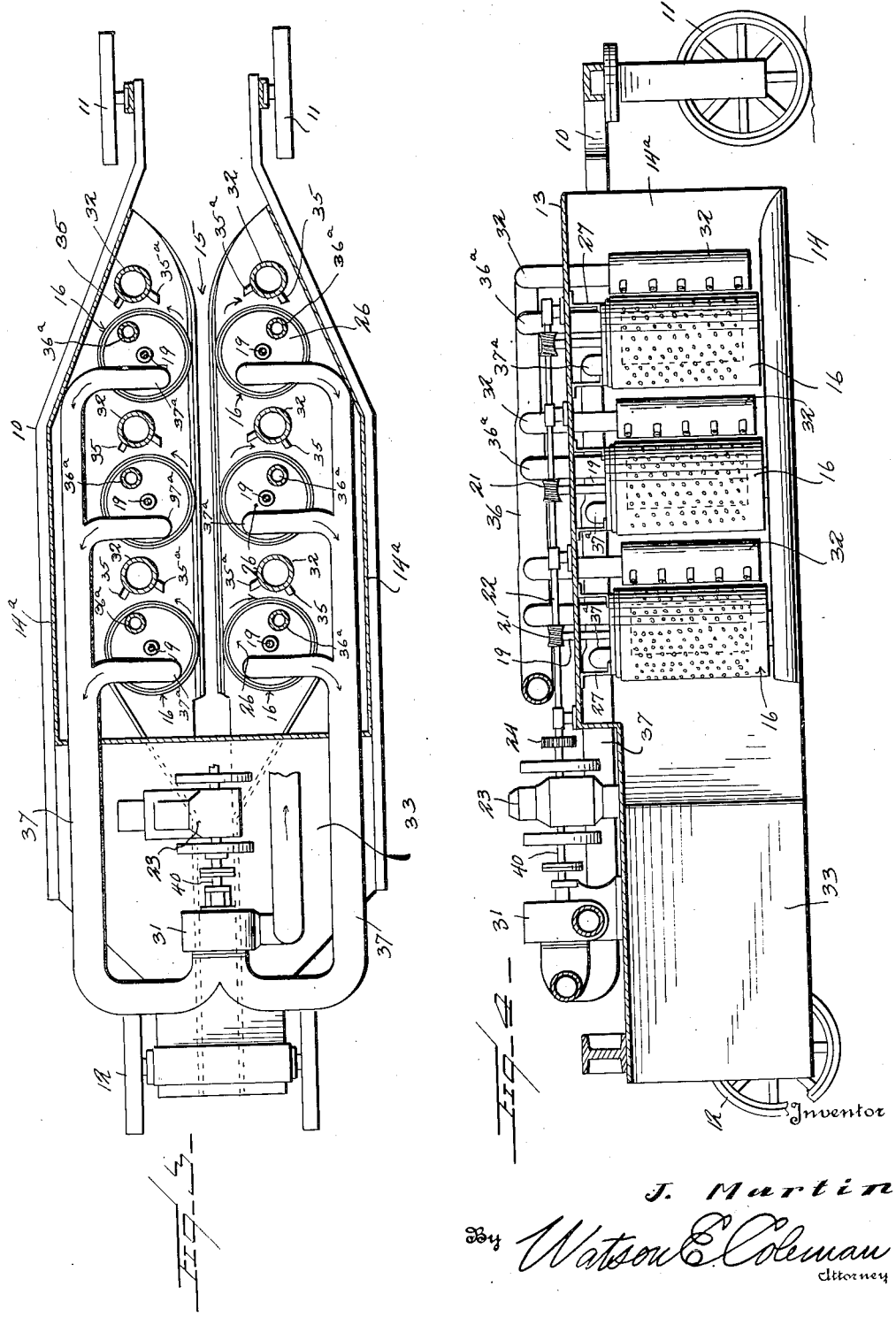

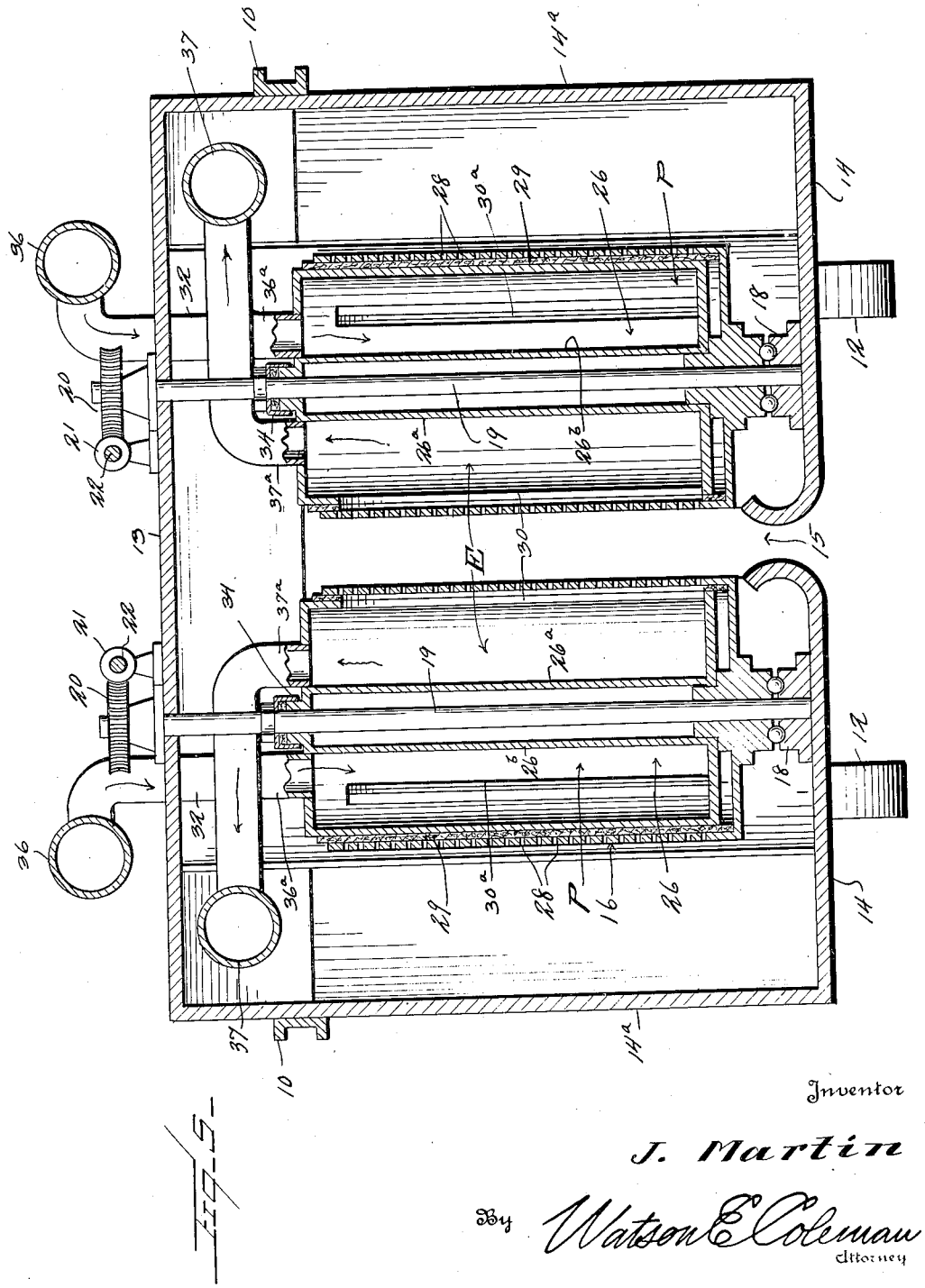

Patented Feb. 16, 1932

1,845,431

UNITED STATES PATENT OFFICE

JESSE MARTIN, OF ROBSTOWN, TEXAS

COTTON PICKER

Application filed June 22, 1929, Serial No. 372,852. Renewed July 14, 1931.

This invention relates to cotton pickers of that type wherein the row of cotton passes between picking members which pull the lint cotton out of the cotton bolls and the general object of the invention is to provide a structure of this character so formed that the bolls and the lint cotton shall be pulled from the plant and that the lint shall be more or less separated from the bolls, trash, leaves, etc., and the lint cotton along with some trash discharged into one portion of the machine.

A further object is to provide a machine of this character which includes one or more pairs of revolving perforated drums, the drums being so perforated that prongs will form which will engage with the lint cotton and the interior of the drums being connected operatively during a certain portion of the travel of each drum with an exhaust fan so that the lint cotton, fragments of bolls, leaves, trash, etc., are held against the drum by exhaustion of air from within the drum, and then as the drum is rotated to a certain position, the exhaustion is cut off so that the trash and the like supported by the exhaustion will fall off and be discharged through the bottom of the machine, while the lint cotton and whatever else is held by the prongs formed by punching the perforations will be carried further around and then stripped from the drums.

A further object is to provide means whereby trash and lint cotton may be separated from the revolving drum not only by preventing the exhaustion of air from certain portions of the drum but by positively blowing air outward through the perforations in the drum.

Other objects will appear in the course of the following description.

My invention is illustrated in the accompanying drawings, wherein:—

Figure 1 is a top plan view of a cotton picker constructed in accordance with my invention;

Figure 2 is a side elevation thereof;

Figure 3 is a horizontal sectional view of the machine;

Figure 4 is a vertical sectional view thereof;

Figure 5 is an enlarged transverse section through the housing and a pair of the drums;

Figure 6 is a horizontal section through the fixed and rotatable drums;

Figure 7 is a vertical section through the fixed drum;

Figure 8 is a fragmentary enlarged sectional view through a drum showing the prongs;

Figure 9 is a section through one of the blast pipes;

Figure 10 shows a modification of the drums.

Referring to these drawings, it will be seen that a wheeled frame 10 is provided which may be of any suitable character and which is supported by the forward wheels 11 and the rear wheels 12. Mounted upon this frame are the upper and lower housing plates 13 and 14 and the vertical outer sheathing 14ª. The upper and lower plates 13 together define a passage 15 which gradually narrows toward the rear of the machine to form a throat, and disposed on each side of this passage are a plurality of rotatable drums 16. These drums as illustrated are each open at the upper end and at the lower end mounted upon a step bearing of any suitable character as for instance upon the ball bearings 18.

Each drum is rotated by means of a shaft 19 which extends vertically upward through the drum and carries at its upper end a worm wheel 20 engaged by a worm 21 mounted upon a longitudinally extending shaft 22. These drums 16 are arranged in pairs, three pairs being shown disposed on each side of the passage 15 and, therefore, there will be two of these shafts 22 mounted in suitable bearings upon the upper housing plate 13 and extending rearward where they are connected to suitable means for driving the shafts.

I have illustrated for this purpose, though I do not wish to be limited thereto, a motor 23 which may be a gasoline engine or anything of this nature, the shaft of which carries the driving gear 24 which is operatively engaged to gears 25 with the shafts 22, though I do not wish to be limited to this, however, it being sufficient that the drums 16 should be driven at a relatively slow speed.

Disposed within each drum 16 is a fixed drum 26 supported by a bracket 27 from the upper housing plate 13. Each of the drums 16 is perforated over its entire surface with perforations 28 which are punched out from the interior of the drum so that the surface of the drum is formed with prongs, as they may be termed (see Figure 8), to which the lint cotton will stick more or less securely. Between the perforated drum 16 and its corresponding fixed drum 26, there is disposed a packing 29 which may be of canvas or any other suitable material. The fixed drum is open or perforated at one point as at 30 and the canvas may be cut away at this point. The interior of each fixed drum is divided by septums 26$^a$ and 26$^b$ to provide two chambers marked respectively E and P. One of these chambers in each drum is connected by a pipe or duct 37$^a$ to the intake 37 of an exhaust fan 31 driven from the engine or motor 23.

Thus the air within the interior of each chamber E of fixed drum is constantly being exhausted or withdrawn. The chamber P is connected by a pipe 36$^a$ to the pressure line 36 and the fixed drum is also open or perforated at 30$^a$ to open into the chamber P. It thus follows that when a portion of the drum 16 passes over the perforated or open area 30 of the fixed drum 26 that air will be drawn in through the perforations 28 of the revolving drum 16 and this will suck lint cotton, fragments of bolls, trash, leaves, etc., against the drum 16 and will retain this material against the face of the drum 16 until that portion of the drum 16 has passed beyond the perforated or open area 30 of the fixed drum. At this time the exhaust action through the perforations 28 will be cut off and the leaves, trash, etc., will drop off of the drum, but the lint cotton will not drop off because it will be engaged by the slight prongs formed by punching out the perforations 28. The drum will therefore carry this cotton and some of the trash around until the drum passes the nozzle 35 whereupon the blast from the nozzle 35 will strike the periphery of the drum and blow off most of the lint, cotton and trash. It will be understood that when the openings in the drum 16 pass the suction opening 30 a considerable portion of the trash and lint will drop off and that after the drum proceeds around in its rotation the blast from the nozzle 35 will loosen the remaining portion of the lint, cotton and trash on the periphery of the drum, this material being blown rearwardly toward the compartment 33. When the openings 28 come into register with the blast opening 30, whatever lint, cotton and trash still remain on the drum 16 will be blown off therefrom and into the path of the blast of air from the nozzles 35 so that the cotton and trash will be blown rearwardly into the compartment 33.

At this point, the lint cotton will be blown off the face of the drum 16 and will be blown along the housing formed by the members 13 and 14 and will be discharged into the compartment 33 at the rear end of the machine.

As shown in Figure 5, the shaft for rotating each rotatable drum passes up through a stuffing box 34 carried by the fixed drum so that no air can escape and so that there will be no reduction in the suction caused by the fan 31. This, of course, is the purpose also of the canvas packing 29.

The blow pipes 32 as before stated, extend vertically and are each provided with a narrow, vertically extending nozzle 35 which discharges the blast of air tangentially against the corresponding drum 16 and in the direction of rotation of the drum. These blow pipes are also provided with a plurality of nozzles 35$^a$ which are directed toward the passageway or slot along which the cotton stalks travel and these nozzles 35$^a$ are designed to project strong blasts of air through the cotton plants as they pass, thereby loosening the cotton from the bolls in the center of the plant and carrying it adjacent to the revolving drum opposite it where it will be subjected to the suction action. Each of the nozzles 35$^a$ will be designed with a Venturi-formed throat in order that the blasts of air may be carried outward in a straight line. The nozzles 35$^a$ on one side of the slot or passageway through which the cotton stalks pass will be in staggered relation to the nozzles 35$^a$ on the opposite side so that the blasts of air from the nozzles 35$^a$ on the right hand side of the machine will not intersect the blasts from the nozzles on the opposite side. Each blast pipe is, of course, connected to a trunk pipe 36 which in turn is connected to the outlet of the exhaust fan 31. Each branch pipe 37$^a$ is connected to a trunk 37 which connects to the inlet end of the exhaust fan casing 31.

While I have heretofore referred to the drums as if the drums were entirely cylindrical in form, I do not wish to be limited to this cylindrical form of drum as preferably the rotatable drums will be formed at intervals with outwardly projecting tubular branches 38 as shown in Figure 10, these tubular branches being perforated at 39 and the branches or projections 38 of one drum being disposed in staggered relation to the branches or projections 38 of the immediately opposite or companion drum. The purpose of these tubular projections 38 is simply to cause all portions of the plants to be affected by the suction so as to draw the lint cotton from the bolls and pick the cotton clean.

While I have illustrated the drums as being rotated by means of a motor or engine and exhaust fan 31 as being driven from the engine 23 through the intermediary of the shaft 40, I do not wish to be limited to this as it is obvious that the exhaust fan and the rotatable drums might be driven by other means as for instance by the traction wheels. I have not thought it necessary to illustrate any means for this purpose as such means will be obvious to any mechanic.

My construction provides for picking the cotton from the stalks as the machine passes down a row and so presenting the drums to the cotton that every portion of the lint cotton will be separated from the plant and from the hulls, dirt, trash, leaves and the like so that the cotton is carried back into the collecting chamber 33 in a relatively clean condition.

In the operation of this mechanism, the drums rotate in the direction of the arrows in Figure 3 and the open area 30 of each fixed drum is disposed immediately adjacent the passage 15. The blast pipes 35ª, as before stated force the plants against the drums and tend to blow off the cotton bolls and loosen the cotton on the bolls and force them toward the revolving drums at the point where the bolls will be subjected to the suction so that the cotton, weeds, etc., will be drawn against the drums, torn away from the stalks and then as the drums continue to revolve, much of the leaves, trash, etc., will be dropped while the blast pipes will drive the cotton rearward into the receiving chamber 33.

While I have illustrated certain details of construction and arrangements of parts, I do not wish to be limited thereto as it is obvious that many minor changes might be made in the details without departing in any way from the spirit of the invention as defined in the appended claims.

I claim:—

1. In a cotton picker, a constantly rotated perforated drum having lint retaining prongs, means for constantly withdrawing air from the interior of the drum whereby to draw lint cotton and trash against the drum, a shield within the drum and extending over a portion of the circumference thereof whereby to cut off the action of the air withdrawing means from that portion of the drum covered by the shield and permit the trash to drop off from the drum, and exteriorly positioned blast means for detaching the lint cotton from said prongs.

2. In a cotton picker, a constantly rotatable perforated picking drum having lint retaining prongs, the drum having tubular substantially radially projecting portions also perforated and formed with lint retaining prongs, means for constantly withdrawing air from the interior of the drum whereby to draw lint cotton and to the drum, a shield within the drum and extending around a portion of the circumference thereof whereby to cut off the action of the air withdrawing means from that part of the drum covered by the shield and permit the trash to drop off therefrom, and exteriorly positioned blast means for detaching the lint cotton from the prongs.

3. In a cotton picker, a constantly rotatable perforated drum having lint retaining prongs, means for constantly withdrawing air from the interior of the drum whereby to draw lint cotton and trash against the drum, a shield within the drum and extending over a portion of the circumference thereof whereby to cut off the action of the air withdrawing means from that portion of the drum covered by the shield and permit the trash to drop off from the drum, and means for detaching the lint cotton from said prongs, said means including blast pipes extending longitudinally of the drum and discharging a blast of air against the face of the drum.

4. In a cotton picker, a wheeled frame having a pair of opposed spaced drum supporting portions defining a longitudinal passageway, a pair of constantly rotating perforated picking drums disposed one on each side of the passageway, each drum having lint retaining prongs, means for constantly withdrawing air from the interior of the drums whereby to draw lint cotton and trash to the drums, a shield within the drum and extending around a portion of the circumference thereof whereby to cut off the action of the air withdrawing means from that portion of the drum covered by the shield and permit trash to drop off from the drum, and means for discharging a blast of air against the exterior surfaces of the drums to detach the cotton from said prongs.

5. A cotton picker including a wheeled frame having opposed spaced drum supporting portions defining a longitudinal passageway, a pair of constantly rotated, perforated picking drums disposed one on each side of the passage, each drum having lint retaining prongs and each drum being formed with radially projecting tubular perforated portions communicating with the interior of the drum, the tubular portions of one drum being staggered with relation to the tubular portions of the opposed drum and the paths of movement of said tubular portions intersecting each other, means for constantly withdrawing air from the interior of the drums whereby to draw lint cotton and trash to the drums, a shield disposed within each drum and extending around a portion of the circumference thereof and having substantially air-tight engagement with the interior of the drum, the shields acting to cut off the action of the air withdrawing means from that portion of each drum covered by the shield to thereby permit the trash to drop from the surface of the drum, and exteriorly positioned blast means for detaching the lint cotton from the prongs of the drums.

6. A cotton picker including a wheeled frame having opposed spaced drum supporting portions defining a longitudinal passageway, a pair of constantly rotated, perforated picking drums disposed one on each side of the passage, each drum having lint retaining prongs and each drum being formed with radially projecting tubular perforated portions communicating with the interior of the drum, the tubular portions of one drum being staggered with relation to the tubular portions of the opposed drum and the paths of movement of said tubular portions intersecting each other, means for constantly withdrawing air from the interior of the drums whereby to draw lint cotton and trash to the drums, a shield disposed within each drum and extending around a portion of the circumference thereof and having substantially air-tight engagement with the interior of the drum, the shields acting to cut off the action of the air withdrawing means from that portion of each drum covered by the shield to thereby permit the trash to drop from the surface of the drum, and means for detaching the lint cotton from the prongs of the drums, said means including blast pipes extending parallel to the axes of the drums and discharging blasts of air tangentially against the outer faces of the drums.

7. A cotton picker including a wheeled frame having opposed spaced drum supporting portions defining a longitudinal passageway, a plurality of constantly rotating perforated picking drums having lint retaining prongs and disposed in series on each side of the passageway, a constantly operated exhaust fan having an induction trunk connected to the interior of the drums and constantly withdrawing air therefrom whereby to draw lint cotton and trash against the surfaces of the drums, a circular shield disposed within each drum and extending around a portion of the circumference thereof and having substantially air-tight engagement therefrom whereby to cut off the action of the air withdrawing means from that part of the drum covered by the shield and permit the trash to drop off therefrom, blast pipes arranged in conjunction with each drum and discharging a blast of air therefrom against the surface of the drum to detach the lint cotton from the prongs, and an outlet trunk extending from the exhaust fan and conducting air to the several blast pipes.

8. A cotton picker including a wheeled frame having opposed spaced frame supporting portions defining a longitudinal passageway, a plurality of vertically disposed rotatable perforated picking drums mounted upon the drum supporting portions on each side of the passageway and having lint retaining prongs, means for constantly rotating said drums, a constantly operated exhaust fan having an inlet trunk leading to the interior of each one of the rotatable drums, fixed drums constituting shields disposed within the interior of the rotatable drums, each fixed drum or shield being apertured adjacent said passageway and having air-tight engagement with the corresponding rotatable drum, each fixed drum acting to cut off the action of the air withdrawing means during a portion of the rotation of the rotatable drum to permit the trash to drop from the face of the drum, blast pipes one for each rotatable drum and discharging a blast of air thereagainst to detach the lint cotton from the prongs thereof, and a trunk leading from the outlet of the exhaust fan and carrying air to said blast pipes.

9. A cotton picker including a wheeled supported frame having opposed spaced upper and lower drum supporting portions defining a longitudinally extending passageway adapted to receive and permit the passage of a row of cotton plants, an outer wall for each of said upper and lower drum supporting portions and constituting with said portions a drum housing, a plurality of rotatable vertically disposed drums mounted on each side of the passageway, each drum being supported by a vertical shaft extending above the drum and each drum being perforated throughout its entire extent and formed with outwardly projecting lint retaining prongs, means connected to said shafts for constantly rotating said drums, an interior cylindrical shield disposed within each drum and having substantially air-tight engagement therewith, the shield being imperforate except at one point and there being apertured, an air exhaust means having an inlet and outlet and having its inlet connected to the interior of all the drums, blast pipes extending parallel to the drums and discharging air thereagainst to detach the cotton from the prongs, the blast pipes being communicatively connected to the outlet from said fan, the blast pipes being disposed adjacent the outer wall of the housing within which the drums are disposed.

10. In a cotton picker, a constantly rotating perforated drum, a cylindrical shield within the drum divided into two compartments, each of which has an opening communicating with the inner surface of the perforated drum, means for constantly withdrawing air from one of said compartments, means for forcing air into the other of said compartments whereby as the drum rotates past one of said openings, cotton bolls and lint cotton will be drawn against the perforated drum and as the drum passes over the other of said openings, the cotton, trash, etc., will be forced off of the drum.

11. In a cotton picker, a wheeled frame having a pair of opposed spaced drum supporting portions defining a longitudinal passageway, a pair of constantly rotating perforated picking drums disposed one on each side of the passageway, each drum having lint retaining prongs, means for constantly withdrawing air from the interior of the drums whereby to draw lint cotton and trash against the drums, a cylindrical shield disposed within each drum and extending around a portion of the circumference whereby to cut off the action of the air withdrawing means from that portion of the drum covered by the shield, pneumatic means for causing the discharge of lint and cotton from the outer surfaces of the drums, and means for discharging blasts of air toward the longitudinal passageway in opposite directions to cause the cotton plants to be forced against the surfaces of the opposed drums.

12. In a cotton picker, a wheeled frame having a pair of opposed spaced drum supporting portions defining a longitudinal passageway, a pair of constantly rotating perforated picking drums disposed one on each side of the passageway, each drum having lint retaining prongs, means for constantly withdrawing air from the interior of the drums whereby to draw lint cotton and trash against the drums, a cylindrical shield disposed within each drum and extending around a portion of the circumference whereby to cut off the action of the air withdrawing means from that portion of the drum covered by the shield, pneumatic means for causing the discharge of lint and cotton from the outer surfaces of the drums, and means for discharging blasts of air toward the longitudinal passageway in opposite directions to cause the cotton plants to be forced against the surfaces of the opposed drums, said means including vertically disposed blast pipes having Venturi-formed nozzles, the nozzles of the blast pipe on one side of said passage discharging toward the drum on the other side of the passage and the nozzles of one pipe being in staggered relation to the nozzles of the other pipe.

In testimony whereof I hereunto affix my signature.

JESSE MARTIN.